(12) United States Patent
Matsumura

(10) Patent No.: US 8,513,379 B2
(45) Date of Patent: Aug. 20, 2013

(54) DEPOLYMERIZATION METHOD FOR POLYMER CONTAINING ESTER BOND IN MAIN CHAIN AND METHOD FOR PRODUCING POLYMER CONTAINING ESTER BOND IN MAIN CHAIN FROM DEPOLYMERIZATION PRODUCT

(75) Inventor: Shuichi Matsumura, Saitama (JP)

(73) Assignee: Keio University, Tokyo (JP)

( * ) Notice: Subject to any disclaimer, the term of this patent is extended or adjusted under 35 U.S.C. 154(b) by 578 days.

(21) Appl. No.: 11/587,791

(22) PCT Filed: Apr. 28, 2005

(86) PCT No.: PCT/JP2005/008241
§ 371 (c)(1),
(2), (4) Date: Oct. 27, 2006

(87) PCT Pub. No.: WO2005/105908
PCT Pub. Date: Nov. 10, 2005

(65) Prior Publication Data
US 2007/0293591 A1    Dec. 20, 2007

(30) Foreign Application Priority Data

Apr. 28, 2004 (JP) ................................. 2004-133594

(51) Int. Cl.
*C08F 8/50* (2006.01)
*C08G 63/06* (2006.01)

(52) U.S. Cl.
USPC ............ 528/490; 528/361; 528/481; 528/482

(58) Field of Classification Search
USPC ......................................... 528/361, 481, 490
See application file for complete search history.

(56) References Cited

U.S. PATENT DOCUMENTS

| 4,273,920 A * | 6/1981 | Nevin ............................ 528/361 |
| 4,683,288 A * | 7/1987 | Tanaka et al. ................. 528/361 |
| 5,264,626 A * | 11/1993 | Brake et al. .................... 562/589 |
| 5,338,822 A | 8/1994 | Gruber et al. |
| 5,346,966 A * | 9/1994 | Spinu ............................. 525/411 |
| 5,952,455 A * | 9/1999 | Yanagisawa et al. .......... 528/361 |
| 6,355,772 B1 * | 3/2002 | Gruber et al. .................. 528/354 |

FOREIGN PATENT DOCUMENTS

| JP | A-56-45920 | 4/1981 |
| JP | A 7-504939 | 6/1995 |
| JP | A 9-313944 | 12/1997 |
| JP | A 10-8067 | 1/1998 |
| JP | A 2002-17384 | 1/2002 |
| JP | A 2002-17385 | 1/2002 |
| JP | A 2002-320499 | 11/2002 |

OTHER PUBLICATIONS

Yahiaoui et al. "An Acid Exchanged Montmorillonite Clay .. " Int.J. Mol.Sci, 2003, 4, pp. 548-561.*
Zeolite Tech Publication, 2012.*
Montmorillonite Tech Publication, 2012.*
Toshiaki Yoshioka et al., "High Selective Conversion of Poly(ethylene terephthalate) into Oil Using Ca(OH)$_2$," Chemistry Letters vol. 33, No. 3, pp. 282-283, 2004.
Haruo Nishida et al., "Thermal Decomposition of poly(1, 4-dioxan-2-one)," Polymer Degradation and Stability, vol. 70, pp. 485-496, 2000.
Harou Nishida et al., "Analysis of the Initial Process in pyrolysis of poly(p-dioxanone)," Polymer Degradation and Stability, vol. 78, pp. 129-135, 2002.
May 10, 2011 Office Action issued in Japanese Patent Application No. 2006-512856 (with translation).

* cited by examiner

*Primary Examiner* — Ling Choi
*Assistant Examiner* — Gennadiy Mesh
(74) *Attorney, Agent, or Firm* — Oliff & Berridge, PLC

(57) ABSTRACT

The invention provides a depolymerization method for a polymer containing an ester bond in a main chain, by causing a solid acid catalyst to act on a polymer containing an ester bond in a main chain to depolymerize the polymer, thereby obtaining a re-polymerizable monomer and/or oligomer as a depolymerization product, and a method for producing a polymer containing an ester bond in a main chain, by polymerizing the re-polymerizable monomer and/or oligomer obtained by the depolymerization method.

18 Claims, 12 Drawing Sheets

DEPOLYMERIZATION METHOD FOR POLYMER CONTAINING ESTER BOND IN MAIN CHAIN AND METHOD FOR PRODUCING POLYMER CONTAINING ESTER BOND IN MAIN CHAIN FROM DEPOLYMERIZATION PRODUCT

TECHNICAL FIELD

The present invention relates to a depolymerization and a re-polymerization of a polymer containing an ester bond in a main chain using a solid acid catalyst, allowing to utilize such polymer in a complete recyclable type.

BACKGROUND ART

Currently, recovery and re-use of useful materials are investigated in products of various fields, and construction of system for sustainable material utilization is being requested. For the re-utilization of products of polymer materials, the products are re-used in their states (also including preparation of fiber materials from PET bottles) or recycled, from the standpoints of the effective utilization of finite carbon resources (C resources) and the saving of finite energy resources. The recycling method includes material recycling method, chemical recycling method and thermal recycling method, but these methods involve drawbacks such as a deterioration of quality such as a molecular weight loss in case of the material recycling method, a high energy consumption in case of the chemical recycling method, and a large carbon oxide gas generation in case of the thermal recycling method. For these reasons, a large proportion of the used plastics is in fact disposed of by combustion or in landfilling.

The above enzyme catalyst method can provide valuable intermediates of synthesis and materials for polymerization with a relatively low energy consumption, but applicable polymers are restricted because of substrate specificity of the enzyme.

Also from the viewpoint of effective utilization of carbon resources, it is ideal to finally return to the raw material by a chemical recycling method, in which known are a monomer recovery by a depolymerization reaction and a raw material monomer recovery by a chemical decomposition reaction. The chemical recycling (recycling to the raw material) of a polycondensation polymer generally requires an acid or base catalyst and a high temperature, and eventually a purifying operation. Also a neutralizing operation is generally necessary. For example a PET liquefying recycling, reported in a latest report, executes a conversion to an oily aromatic mixture by means of $Ca(OH)_2$ catalyst and a high-temperature process at 700° C. (see, bellow identified Non-Patent Reference 1). However, the low-molecular compounds obtained in this way are unsuitable as a raw material for re-polymerization or synthesis.

Also in an example of polylactic acid, a technology of thermally decomposing poly-L-lactic acid to a lactide at a temperature of 280° C. or higher has been developed, it requires a high temperature and a detriment has been reported that the L-isomer of lactic acid is isomerized to a D,L-mixture. Also a method of processing a polylactic acid with ammonia water has been reported, but, isomerization takes place also in this case, and the generated lactic acid has to be neutralized and isolated from an aqueous solution, involving unnegligible energy. Various investigations have thus been made on the thermal decomposition of polylactic acid. However, various factors influence the thermal-decomposition and the behavior of the thermal decomposition is not uniform but still includes many unclarified phenomena. For example a clear matching cannot be recognized in a ceiling temperature, and very many mechanisms of thermal decomposition have been reported. It is also considered that plural reactions proceed simultaneously or in succession, and these facts have been an obstacle to a detailed dynamic analysis of polylactic acid (see, below identified Non-Patent References 2 and 3).

Considering the above, the present inventor has already proposed a polymer decomposition method and a polymer producing method of a complete recycling type, with a low energy consumption by the use of an enzyme. A decomposition method disclosed in the below identified Patent Reference 1 is a method of depolymerizing a trimethylene carbonate polymer in the presence of a hydrolyzing enzyme to produce trimethylene carbonate (1,3-dioxan-2-one), and the below identified Patent Reference 2 discloses a method of processing a caprolactone polymer with a hydrolyzing enzyme to producing dicaprolactone which is a cyclic dimer of caprolactone, and a method of polymerizing dicaprolactone in the presence of a hydrolyzing enzyme to produce a caprolactone polymer. Also the below identified Patent Reference 3 discloses a method of depolymerizing polyalkylene alkanoate or poly(3-hydroxyalkanoate) into an oligomer principally constituted of cyclic compounds, utilizing a hydrolyzing enzyme as described above and a method of polymerizing the cyclic oligomer.

The depolymerization in these methods is of a low energy consumption, because of the use of an enzyme, and the products obtained by the depolymerization can be again polymerized into polymers by an enzyme, so that these methods can effectively utilize the carbon resources without waste and can be considered as a polymer re-utilization of complete recycling type. Therefore, from the viewpoint of sustainable material utilization, the aforementioned methods are practical chemical recycling methods. Also the enzyme catalyst methods above are optimum for obtaining cyclic monomer or oligomer that is re-polymerizable.

On the other hand, as a detriment resulting from the substrate specificity of enzyme, these methods are limited to polymers susceptible to an enzyme reaction. Also the enzyme catalyst, being a protein catalyst, involves limitations inherent thereto, such as that the reaction temperature cannot be made very high and that it requires a long time to the completion of reaction for a polymer having a high crystallinity and a high intermolecular force.

Patent Reference 1: Japanese Patent Application Laid Open (JP-A) 2002-17384

Patent Reference 2: JP-A-2002-17385

Patent Reference 3: JP-A-2002-320499

Non-Patent Reference 1: T. Yoshioka et al., Chemistry Letters, Vol. 38, No. 3, p.282-283 (2004)

Non-Patent Reference 2: H. Nishida et al., Polymer Degradation and Stability, Vol. 70, p.485(2000)

Non-Patent Reference 3: H. Nishida et al., Polymer Degradation and Stability, Vol. 78, p.129 (2002)

DISCLOSURE OF INVENTION

Problems to be Solved in the Invention

The present invention has been made in consideration of the aforementioned problems, and an object thereof is to provide a depolymerization method for a polymer containing an ester bond in a main chain, featuring a lower temperature, a higher selectivity and a lower environmental load in comparison with the prior methods utilizing thermal decomposition or utilizing an acid or a base, and capable of providing a re-polymerizable monomer and/or oligomer as a depolymerization product, and also to provide a producing method for a polymer containing an ester bond in a main chain, from such depolymerization product.

Means for Solve the Problems

The aforementioned problems can be solved by the following depolymerization method and the polymer producing method:

(1) A depolymerization method for a polymer containing an ester bond in a main chain, the method comprising causing a solid acid catalyst to act on a polymer containing an ester bond in a main chain to depolymerize the polymer, thereby obtaining a re-polymerizable monomer and/or oligomer as a depolymerization product.

(2) The depolymerization method for a polymer containing an ester bond in a main chain as described in (1), wherein the polymer containing an ester bond in a main chain is a polylactic acid, a polylactone, a polyalkylene alkanoate or a poly(3-hydroxy alkanoate).

(3) A method for producing a polymer containing an ester bond in a main chain, which comprises polymerizing the re-polymerizable monomer and/or the oligomer obtained by the depolymerization method as described in (1) or (2).

Effect of the Invention

The depolymerization method for a polymer containing an ester bond in a main chain of the present invention features a lower temperature, a higher selectivity and a lower environmental load in comparison with the prior methods utilizing thermal decomposition or utilizing an acid or a base, and the product of the depolymerization has a re-polymerizable property. Therefore, the depolymerization method of the present invention provides a complete recycling method.

The solid acid catalyst to be employed in the present invention is recoverable by filtration after the reaction, does not require neutralization with an alkali (thus not generating a salt and not requiring salt removal), and does not generate harmful reagent residues. Therefore the depolymerization method of the present invention enables easy purification of the reaction products, and, considering also after reaction processing, it does not require excessive energy or resources in comparison with general methods utilizing acids, thus can be considered as an environmentally acceptable method.

Also in contrast to enzyme methods described above, although it cannot provide cyclic oligomers selectively, however it is applicable to the depolymerization of a wider variety of polymers.

BEST MODE FOR CARRYING OUT THE INVENTION

Figure 1:
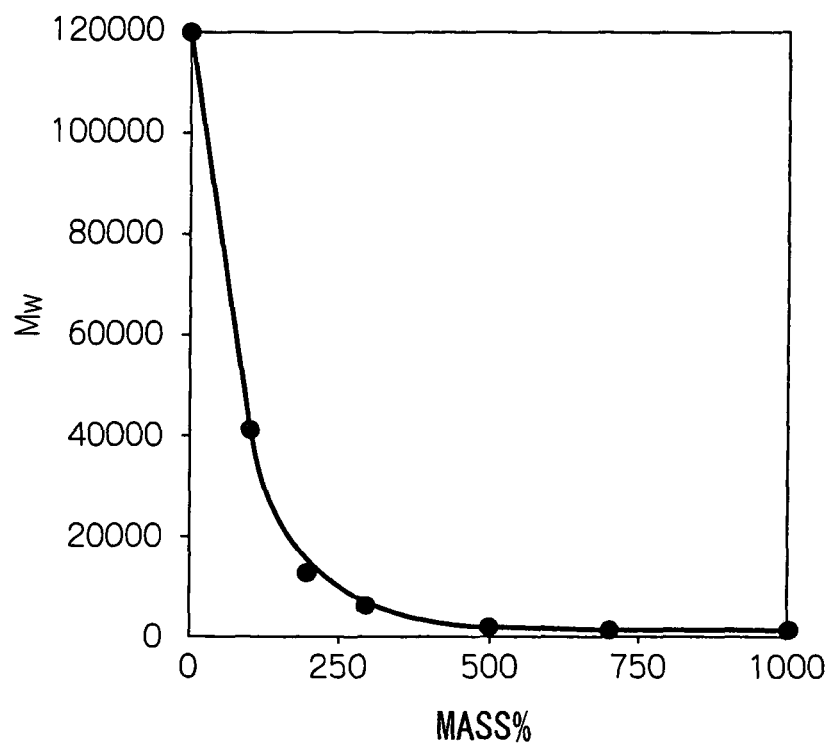
[FIG. 1] A graph showing a relationship between an amount of Montmorillonite K10 and Mw of a decomposed polymer.

In the present invention, the solid acid catalyst means a solid which has an acidic group on the surface and in which an acidic site functions as a catalytic active site.

Known representative solid acid catalysts include Nafion-H, sulfated zirconia (VI), and Montmorillonite K10.

Nafion-H is a cation exchange resin (perfluorinated ion-exchange powder) developed by DuPont, and has a side chain with a terminal sulfonic group on a linear chain of a fluorinated resin, and exhibits an acidity stronger than that of 100% sulfuric acid.

Sulfated zirconia (VI), having a composition $SO_4/ZrO_2$, which is obtained by sintering zirconium oxide to which sulfate ions have been adsorbed and further adding zirconium dioxide, and exhibits an excellent acidity as a Lewis acid. In the presence of water, it generates sulfate ions.

Further, Montmorillonite K10 is a smectite which is a clay mineral, and has a laminated structure in which tetrahedral sheets of silicic acid sandwich an octahedral sheet of alumina, sharing oxygen atoms. Montmorillonite K10, having a negative charge in the crystal lattice and adsorbing exchangeable cations between the layers, has $H^+$ as a cation and contains a large amount of water therearound.

As the solid acid catalyst, in addition to those cited above, there can also be utilized, for example, Dowex 50W-X8 or 50W-X2 or Duolite C20. It is also possible to utilize vermiculite or heteropolyacid, or further a Zeolite catalyst such as MCM-22.

The solid acid is an acid catalyst insoluble in a solvent, and has following advantages in comparison with soluble ones.

1. Conventional alkali processes generally are incapable of, or find it difficulties in, obtaining an oligomer mixture having re-polymerization properties and reactivity, and, for example, an alkali depolymerization of polylactic acid decomposes it to a lactic acid monomer. When in the decomposition of a polymer it is intended to re-polymerize the decomposition product, the depolymerization product is preferably an oligomer which is also a polymerization intermediate, rather than a monomer, and the depolymerization by the solid acid of the invention allows the easy obtaining of an oligomer mixture having re-polymerization properties and reactivity.

2. An oligomer mixture, having re-polymerization properties and reactivity, can be obtained directly, at a relatively low temperature. In prior technologies, for example decomposition with an alkali, the product is an alkali salt, which requires a neutralizing operation with an acid in order to be used as a polymerization raw material or a chemical raw material. This operation requires a strong acid, in addition to the alkali as the catalyst, and also generates a salt. Also a purifying operation is additionally required, in order to remove salts, excessive acid or unreacted salts. Also the alkali decomposition requires a considerably high temperature, is accompanied by generation of by-products and decomposition products other than the desired ones, and is accompanied by a color deterioration associated therewith. The chemical recycling utilizing the solid acid is expected to achieve energy savings and have a low environmental load.

3. The use of solid acid catalyst enables a separation of the product by filtration alone. On the other hand, in a decomposition of polymer, such as a polylactic acid, with an alkali such as ammonia, the generated lactic acid forms a salt, which has to be neutralized (thus generating an unnecessary salt), and a dehydration process and a purification of hydrated lactic acid also become necessary. In contrast, in the case of utilizing a solid acid catalyst, lactic acid is obtained as a free carboxylic acid, thus not requiring neutralization and providing free lactic acid oligomers which are directly re-polymerizable as they are.

4. The solid acid catalyst is re-usable repeatedly by simple post-processing such as rinsing with water and drying.

5. The solid acid catalyst is not deactivated even at a high temperature, and is applicable to decomposition of a broad range of polymers.

6. The solid acid catalyst is easy to handle as it lacks an irritant odor or corrosive properties, and is not very hazardous.

Among the solid acids above, Montmorillonite K10 and Nafion-H have a high activity, and particularly Montmorillonite K10 is preferable as the solid acid catalyst for use in the present invention, as it is a clay mineral which is safe, easy to handle and a substance with a low environmental load, and as it is available inexpensively in large quantities (at a cost of from 0.5 to 2 times compared to that of 95% sulfuric acid).

The polymer to be decomposed by the solid acid in the invention is a polymer containing an ester bond in a main chain of the polymer, and may contain, in the main chain of the polymer, a bond other than the ester bond such as an amide bond, a carbonate bond, or an urethane bond. A typical example of the polymer, including an ester bond in the main chain of the polymer, is a polyester, for example a polyester or a copolymer such as a polylactic acid, a polyalkylene alkanoate, or a poly(3-hydroxyalkanoate), a polylactone or a copolymer thereof, a poly(ester-carbonate), a poly(ester-amide), or a poly(ester-urethane), or the like.

Further, the molecular weight (weight-average) of the polymer is not particularly restricted, and can be sufficiently decomposed with a molecular weight of a level ordinarily employed in molded products, or a smaller molecular weight.

As the polylactic acid mentioned above, a polylactic acid or a polylactic acid copolymer may be used without any particular restriction. Examples of homopolymers include poly(L-lactic acid), poly(DL-lactic acid), syndiotactic poly (DL-lactic acid), and atactic poly(DL-lactic acid).

Examples of the polylactic acid copolymers include copolymers of polylactic acids with a co-monomer copolymerizable with a lactide, for example a medium- to large-membered cyclic lactone such as β-propiolactone, β-butyrolactone (β-BL), ε-caprolactone (ε-CL), 11-undecanolide and 12-undecanolide, a cyclic ester oligomer, a linear ester oligomer, a hydroxy acid such as ricinoleic acid or an ester thereof.

The polyalkylene alkanoate is a polyester prepared from a dicarboxylic acid containing 4 to 10 carbon atoms and a diol containing 2 to 6 carbon atoms, and two or more kinds of each of dicarboxylic acid and diol may be employed. Examples include polyethylene adipate, polyethylene succinate and polybutylene succinate, and those described in JP-A No. 2002-320499, paragraphs 0019 to 0025, but these examples are not exhaustive.

The poly(3-hydroxyalkanoate) is a polymer or a copolymer of 3-hydroxycarboxylic acid containing 3 to 15 carbon atoms, and examples thereof include poly(3-hydroxybutyric acid), a 3-hydroxybutyric acid/3-hydroxypropionic acid copolymer (PHB/PHP), a 3-hydroxybutyric acid/3-hydroxyvalerianic acid copolymer (PHB/PHV), and those described in JP-A No. 2002-320499, paragraphs 0032 to 0034, but these examples are not exhaustive.

Examples of the polylactone include a polymer or a copolymer of a medium- to large-membered cyclic lactone such as β-propiolactone, β-butyrolactone (β-BL), ε-caprolactone (ε-CL), 11-undecanolide or 12-undecanolide, but these examples are not exhaustive.

The polymer decomposition reaction using a solid acid catalyst is generally carried out by dispersing the solid acid catalyst in a solvent in which the polymer is dissolved, and regulating the temperature to an appropriate temperature, for a predetermined time. The heating temperature and the heating time are suitably selected according to a combination of the type of solvent used, the type of catalyst and the type of polymer to be decomposed.

An amount of the solid acid catalyst to the polymer is variable depending on the active site density of the used solid acid catalyst and type of the polymer, but is generally within a range of from about 1 to 1,000 mass % with respect to the polymer (mass).

The decomposition product obtained by the depolymerization method of the invention is re-polymerizable monomers and/or oligomers. Such monomers and/or oligomers are generally obtained both in linear types and cyclic types, and the cyclic ones or linear ones are preferentially obtained depending for example on the type of the raw material polymer, the type of solvent, the type of catalyst and water content in the system (water contained in the solvent and the catalyst; for example Montmorillonite K10 contains a large amount of interlayer water). A larger amount of water in the system tends to provide linear oligomers.

Figure 9:
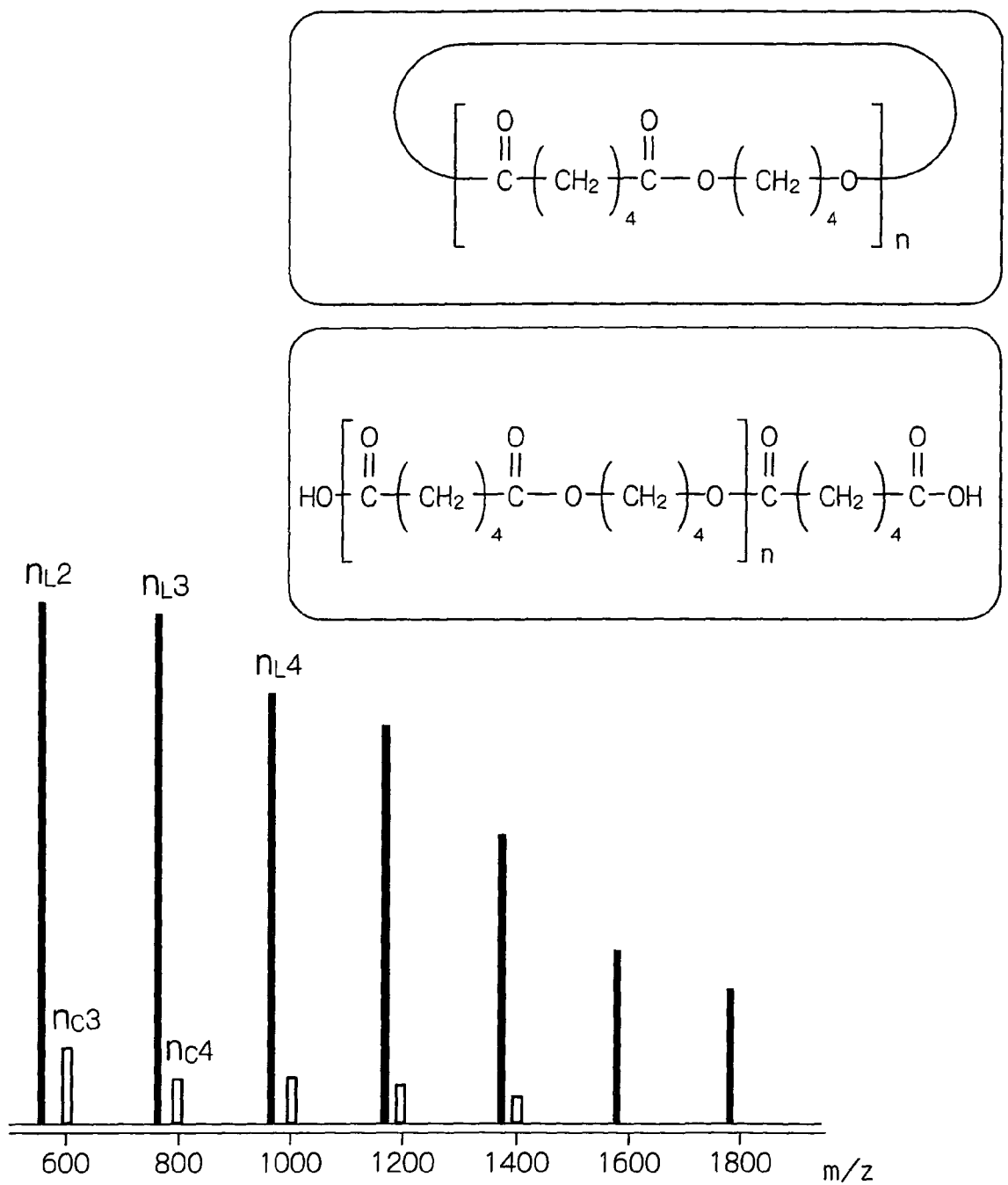
[FIG. 9] A graph showing a result of MALDI-TOF MS analysis of the decomposition product in Example 11.

For example, in Example 10, the decomposition product of a polycaprolactone is a mixture of cyclic oligomers as principal components and linear oligomers in small amounts (cf FIG. 7), and, in Example 9, the decomposition product of a polybutylene adipate is a mixture of linear oligomers as principal components and cyclic oligomers in small amounts (cf FIG. 9).

The decomposition product, obtained by the chemical recycling method of the invention, can be easily re-polymerized or may be copolymerized with other cyclic monomers and/or cyclic oligomers. For the re-polymerization, ordinary methods for synthesizing a polylactic acid, a polyalkylene alkanoate, a poly(3-hydroxyalkanoate) or a polylactone can be employed.

In case of a depolymerization product principally constituted of cyclic monomers and/or oligomers, it may be copolymerized with another cyclic monomer or oligomer, for example a cyclic lactone such as lactide, ε-caprolactone, dicaprolactone, β-pripiolactone, β-butyrolactone, benzyl β-malolactonate, or pentadecanolactone.

In the following, the present invention will be further explained by examples, but the present invention is not at all limited by these examples.

EXAMPLE 1

Oligomer Formation from Polylactic Acid (PLLA) by Montmorillonaite-K10

In an eggplant-shaped flask, 80 mg of poly-L-lactic acid (PLLA, molecular weight Mn=85,000, molecular weight Mw=121,000) and 4,000 mg of Montmorillonite K10 were weighed, then 10 mL of toluene were added, and the mixture reacted for 6 hours in an oil bath at 100° C. After the reaction, 10 mL of chloroform were added to dissolve the contained material, and the insoluble catalyst was filtered off. The separated catalyst was agitated with 10 mL of acetone, to dissolve oligomers remaining on the catalyst in the acetone. After the toluene-chloroform solution and the acetone extract were united, the solvents were concentrated under a reduced pressure to obtain oligomers substantially quantitatively.

As a result of GPC analysis, it was confirmed that PLLA was completely decomposed to generate oligomers having a molecular weight Mn=250.

Further, a MALDI-TOF MS analysis confirmed that the product was a mixture of a lactic acid monomer in a proportion of 22%, a lactic acid dimer of 17%, a lactide of 10% and other linear oligomers (having an average polymerization degree of monomer of 4.8) of 51%. Cyclic compounds were also generated in a certain amount. In an investigation of optical purity by HPLC utilizing a chiral column on the lactic acid monomers, L-lactic acid alone was detected, at a level almost the same as in the raw material lactic acid. This fact confirmed absence of generation of isomerization.

The Poly-L-lactic acid mentioned above was dissolved in dry toluene (concentration: 5 mg PLLA/mL toluene), and decomposition reaction (100° C., 24 hrs) was conducted with various amounts (mass %) of Montmorillonite K10 relative to poly-L-lactic acid to obtain results shown in FIG. 1. As shown in FIG. 1, the amount of Montmorillonite K10 was closely correlated with a degree of decrease of molecular weight (Mw) (degree of decomposition), and the molecular weight of the oligomers was lowered in proportion to the amount of the solid acid up to 500%, but the molecular weight of the oligomers remained almost constant with larger amounts.

Figure 2:
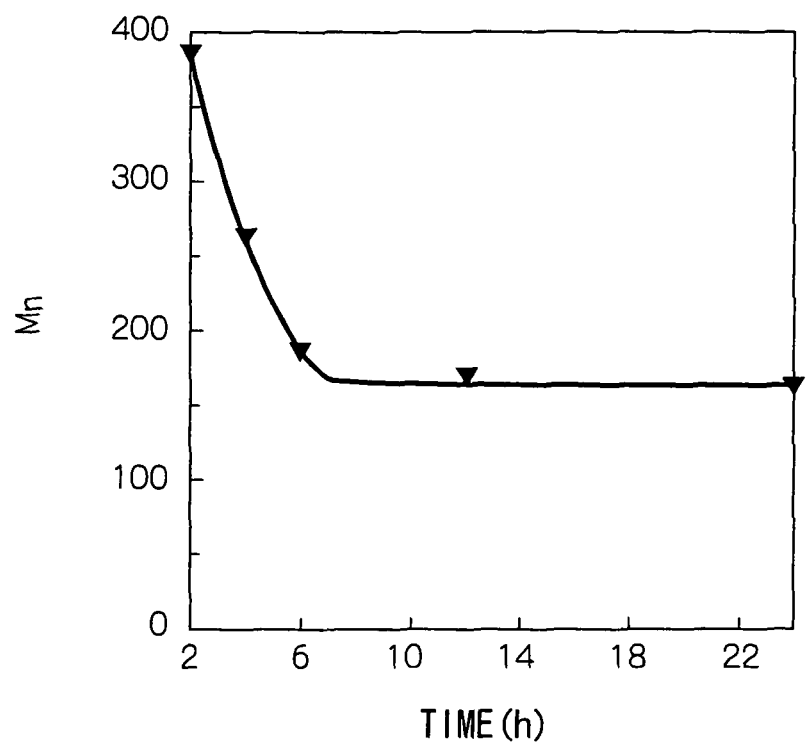
[FIG. 2] A graph showing a relationship between a reaction time in Example 1 and Mn of a decomposed polymer.

Further, poly-L-lactic acid mentioned above was dissolved in toluene saturated with water (concentration: 80 mg PLLA/mL toluene), and was reacted at 100° C. for 24 hrs after adding Montmorillonite K10 in an amount of 500 mass % to poly-L-lactic acid, to obtain a change with the lapse of time as shown in FIG. 2. In the reaction, the molecular weight was observed to rapidly decrease in the initial 6 hours, but to remain substantially constant thereafter.

Figure 3:
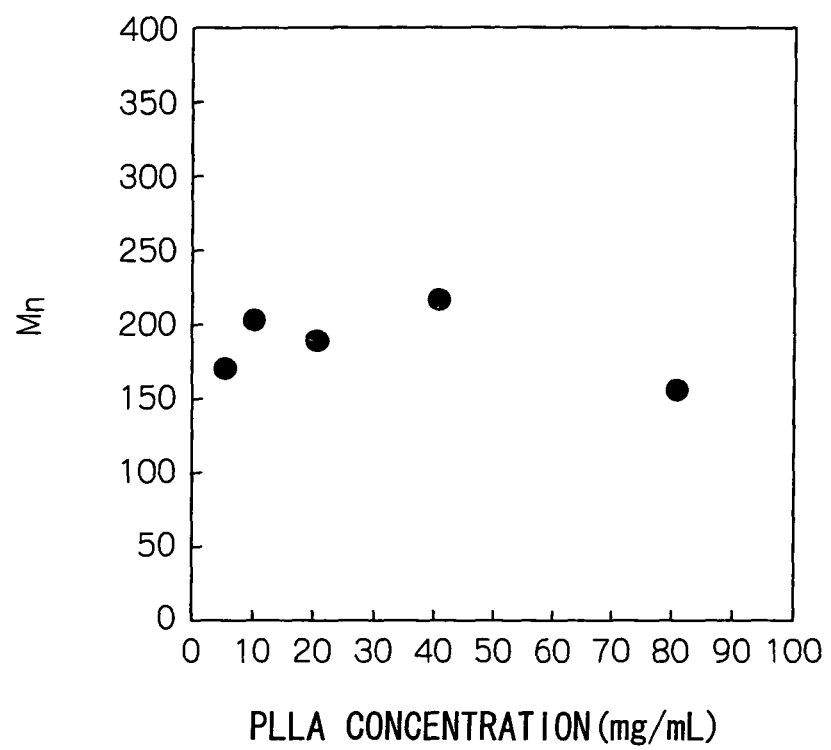
[FIG. 3] A graph showing a relationship between a PLLA concentration in Example 1 and Mn of a decomposed polymer.

Further, an investigation of the influence of concentration of poly-L-lactic acid, in the reaction solution (solvent: toluene), on the weight-average molecular weight of the decomposition product provided results as shown in FIG. 3. Conditions were a reaction temperature of 100° C., a reaction time of 24 hours and an amount of Montmorillonite K10 of 500 mass % to poly-L-lactic acid. The generated oligomers did not show an apparent difference in the molecular weight, within a polymer concentration range, in the decomposition, of from 5 to 80 mg/mL.

EXAMPLE 2

Re-Polymerization of L-Lactic Acid (LLA) Oligomers

Polylactic acid (PLLA, molecular weight Mn=85,000, molecular weight Mw=121,000) was decomposed with Montmorillonite K10 in the same manner as in Example 1, and the obtained oligomers, having molecular weight Mn=200, were subjected to a re-polymerization. Polymerization was conducted by adding $SnCl_2.2H_2O$ in an amount of 0.3 mass % with respect to the oligomers and p-TSA catalyst in an amount of 0.2 mass % with respect to the oligomers, and by executing a reaction at a reaction temperature of 180° C. and a pressure of 10 mmHg for 10 hours, thereby obtaining polylactic acid having a molecular weight Mw=35,000.

This fact confirmed that the oligomers, obtained by a decomposition with Montmorillonite K10 had re-polymerization property. In $^1$HNMR of the generated polymer, a methine peak in the main chain ($\delta$=5.16 ppm) appeared as a singlet, and this fact confirmed that the polymer was all constituted of L-compound. Thus, the steric structure of polylactic acid (PLLA) was retained in the chemical recycling by decomposition with Montmorillonite K10 and by re-polymerization.

EXAMPLE 3

Re-Polymerization of L-Lactic Acid (LLA) Oligomers

Polylactic acid (PLLA, molecular weight Mn=85,000, molecular weight Mw=121,000) was decomposed with Montmorillonite K10 in the same manner as in Example 1, and 0.3 g of the obtained oligomers, having a molecular weight Mn=250, were re-polymerized by a bulk polymerization. Polymerization was conducted by adding $SnCl_4$p-TSA catalyst (1/1, mol/mol) in an amount of 0.9 mass % with respect to the oligomers, and executing a reaction for 6 hours at a reaction temperature of 175° C. and a pressure of 17 mmHg. The reaction product was then crushed, and further polymerized for 2 hours at a reaction temperature of 105° C. and a pressure of 3 mmHg, and further for 20 hours at a reaction temperature of 150° C. and a pressure of 3 mmHg, thereby obtaining polylactic acid having a molecular weight Mw=110,000.

This fact confirmed that the oligomers, obtained by a decomposition with Montmorillonite K10 had re-polymerization property. In $^1$HNMR of the generated polymer, a methine peak in the main chain ($\delta$=5.16 ppm) appeared as a singlet, and this fact confirmed that the polymer was all constituted of L-compound. Thus, the steric structure of polylactic acid (PLLA) was retained in the chemical recycling by decomposition with Montmorillonite K10 and by re-polymerization.

EXAMPLE 4

Oligomer (Ethyl Ester) Formation from Polylactic Acid (PLLA) by Montmorillonite K10

In a small test tube equipped with a screw cap, 15 mg of polylactic acid (PLLA, molecular weight Mn=85,000, molecular weight Mw=121,000) the same as that employed in Example 1 and 75 mg of Montmorillonite K10 were weighed out, then 3 mL of toluene and 24 µL of ethanol (2 when converted to lactic acid equivalents) were added, and the mixture was reacted for 24 hours in an oil bath of 100° C. After the reaction, 10 mL of chloroform was added to dissolve the contained material, and the insoluble catalyst was filtered off. Then the obtained solution was concentrated under a reduced pressure to obtain oligomers with an yield of 83%.

As a result of GPC analysis, it was confirmed that PLLA having Mw=121,000 was completely decomposed to generate oligomers having a molecular weight Mn=1,300.

Figure 4:
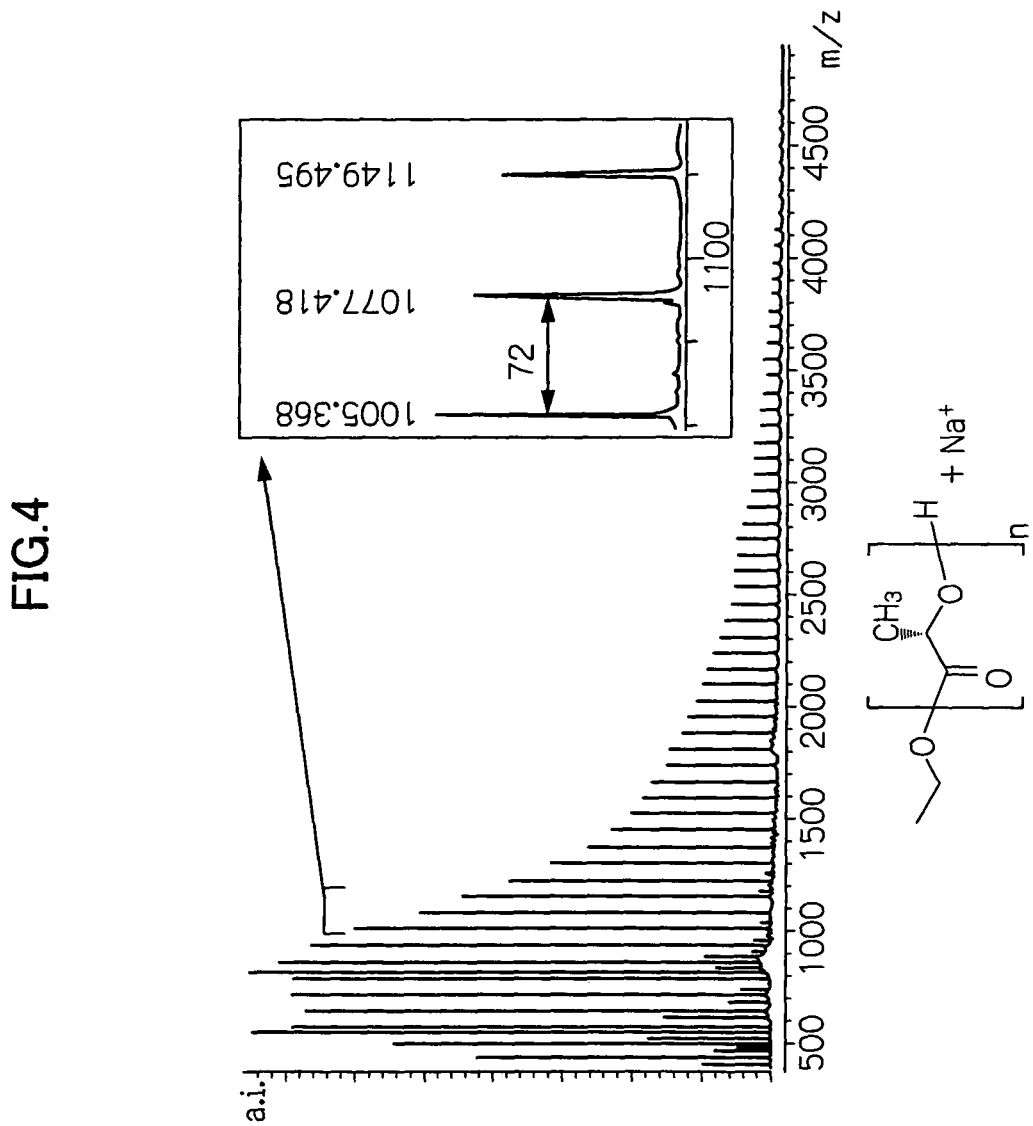
[FIG. 4] A graph showing a result of MALDI-TOF MS analysis of the decomposition product in Example 4.

Also a MALDI-TOF MS analysis confirmed that the product was a mixture of lactides and linear oligomers (complete ethyl ester at terminal end) (cf FIG. 4).

EXAMPLE 5

Typical Oligomer (Ethyl Ester) Formation from Polylactic Acid (PLLA) by Montmorillonaite-K10 and Re-Polymerization 5.0 g of polylactic acid (PLLA, molecular weight Mn=85,000, molecular weight Mw=121,000) the same as that employed in Example 1 were dissolved in toluene of 100° C., then 2.8 mL of ethanol and dry Montmorillonite K10 (20 g) were added, and the mixture was reacted under agitation for 6 hours at 100° C. to obtain oligomers of a molecular weight of Mn=700 with a recovery rate of 96%.

Figure 5:
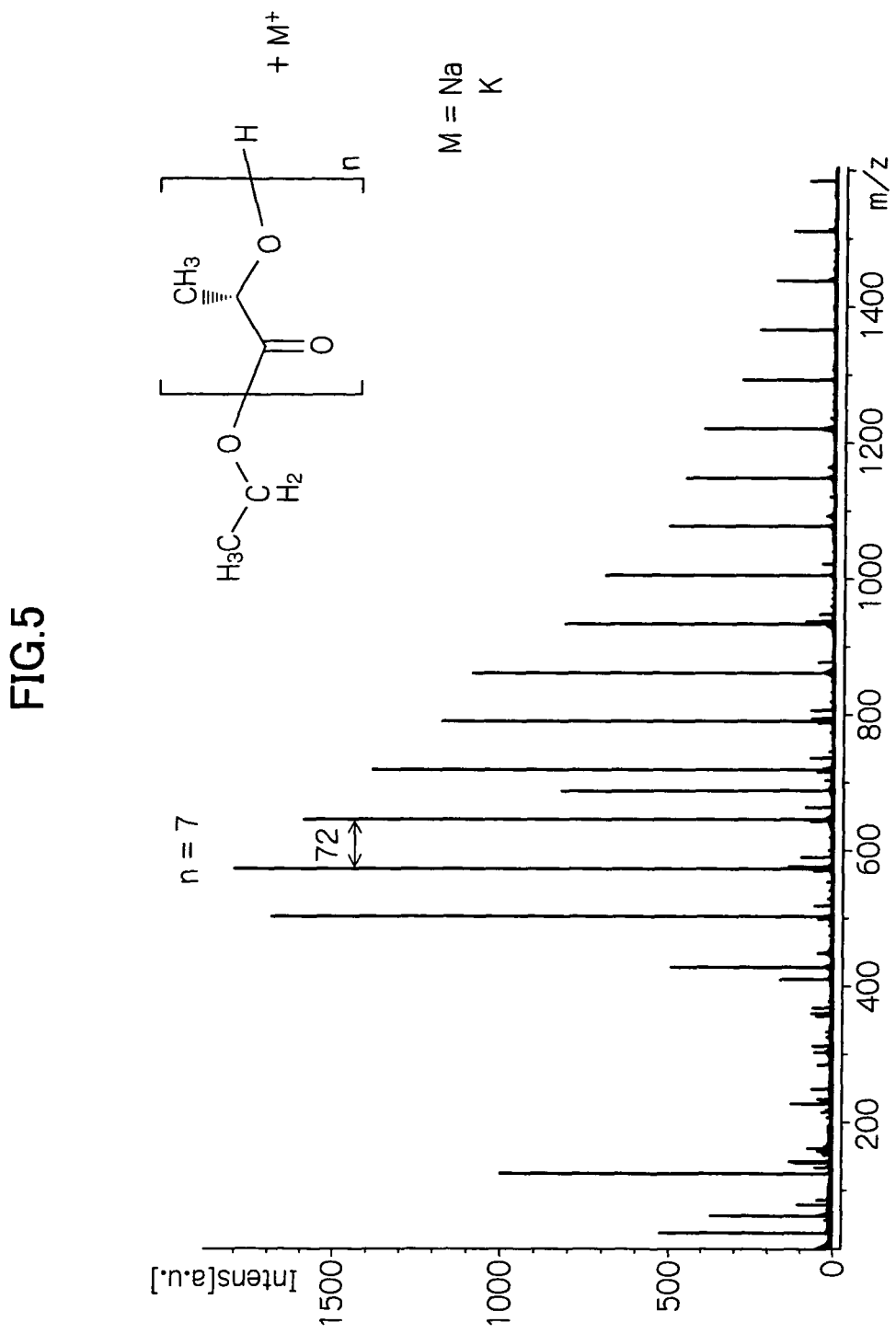
[FIG. 5] A graph showing a result of MALDI-TOF MS analysis of the decomposition product in Example 5.

A MALDI-TOF MS analysis confirmed a homologous mixture of linear oligomers completely ethyl esterified at terminal ends (cf FIG. 5).

3.0 g of the obtained oligomers of terminal ethyl ester type, having a molecular weight Mn=700, were re-polymerized by a bulk polymerization. Polymerization was conducted by adding $SnCl_2$/p-TSA catalyst (1/1, mol/mol) in an amount of 0.6 mass % with respect to the oligomers, and executing a reaction for 6 hours at a reaction temperature of 175° C. and a pressure of 17 mmHg. The reaction product was then crushed, and further polymerized for 2 hours at a reaction temperature of 105° C. and a pressure of 3 mmHg, and further for 20 hours at a reaction temperature of 150° C. and a pressure of 3 mmHg, thereby obtaining polylactic acid having a molecular weight Mw=30,000.

This fact confirmed that the oligomers of terminal ethyl ester type obtained by a decomposition with Montmorillonite K10 had re-polymerization property.

EXAMPLE 6

Oligomer Formation from Polycaprolactone (PCL) by Montmorillonite K10

In a small test tube equipped with a screw cap, 15 mg of polycaprolactone (PCL, molecular weight Mw=39,000) and 75 mg of Montmorillonite K10 were weighed out, then 1.5 mL of toluene were added, and the mixture was reacted for 1 day in an oil bath of 100° C. After the reaction, 10 mL of chloroform was added to dissolve contained material, and the insoluble catalyst was filtered off. Then the obtained solution was concentrated under a reduced pressure to obtain oligomers with an yield of 75%.

As a result of GPC analysis, it was confirmed that PCL was completely decomposed to generate oligomers having a molecular weight Mw=300.

Also a MALDI-TOF MS analysis confirmed that the product was a mixture of cyclic and linear oligomers.

EXAMPLE 7

Oligomer Formation from Polyethylene Adipate (Pea) by Montmorillonite K10

In a small test tube equipped with a screw cap, 15 mg of polyethylene adipate (PEA, molecular weight Mw=14,000) and 75 mg of Montmorillonite K10 were weighed out, then 1.5 mL of toluene were added, and the mixture was reacted for 1 day in an oil bath of 100° C. After the reaction, 10 mL of chloroform was added to dissolve the contained material, and the insoluble catalyst was filtered off. Then the obtained solution was concentrated under a reduced pressure to obtain oligomers with an yield of 65%.

As a result of GPC analysis, it was confirmed that PEA was completely decomposed to generate oligomers having a molecular weight Mw=800.

Also a MALDI-TOF MS analysis confirmed that the product was a mixture of linear oligomers of ABA type, having carboxyl groups on both terminal ends of an oligomer chain, AB type having a carboxyl group and a hydroxyl group on both terminal ends of an oligomer chain and so on, and cyclic oligomers.

EXAMPLE 8

Oligomer Formation from Polyethylene Succinate (PES) by Montmorillonaite-K10

In a small test tube equipped with a screw cap, 15 mg of polyethylene succinate (PES, molecular weight Mw=24,000) and 75 mg of Montmorillonite K10 were weighed out, then 1.5 mL of toluene were added, and the mixture was reacted for 1 day in an oil bath of 100° C. After the reaction, 10 mL of chloroform was added to dissolve the contained material, and the insoluble catalyst was filtered off. Then the obtained solution was concentrated under a reduced pressure to obtain oligomers with an yield of 60%.

As a result of GPC analysis, it was confirmed that PES was completely decomposed to generate oligomers having a molecular weight Mw=600.

Also a MALDI-TOF MS analysis confirmed that the product was a mixture of linear oligomers of ABA type, having carboxyl groups on both terminal ends of an oligomer chain, AB type having a carboxyl group and a hydroxyl group on both terminal ends of an oligomer chain and so on, and cyclic oligomers.

EXAMPLE 9

Oligomer Formation from Polybutylene Adipate (PBA) by Montmorillonite K10

In a small test tube equipped with a screw cap, 15 mg of polybutylene adipate (PBA, molecular weight Mw=14,000) and 75 mg of Montmorillonite K10 were weighed out, then 1.5 mL of toluene were added, and the mixture was reacted for 1 day in an oil bath of 100° C. After the reaction, 10 mL of chloroform was added to dissolve the contained material, and the insoluble catalyst was filtered off. Then the obtained solution was concentrated under a reduced pressure to obtain oligomers with an yield of 55%.

As a result of GPC analysis, it was confirmed that PBA was completely decomposed to generate oligomers having a molecular weight Mw=700.

Also a MALDI-TOF MS analysis confirmed that the product was a mixture of linear oligomers of ABA type, having carboxyl groups on both terminal ends of an oligomer chain, AB type having a carboxyl group and a hydroxyl group on both terminal ends of an oligomer chain and so on, and cyclic oligomers.

EXAMPLE 10

Oligomer Formation from Polycaprolactone (PCL) by Nafion-H

In a small test tube equipped with a screw cap, 15 mg of polycaprolactone (PCL, molecular weight Mn=26,000, molecular weight Mw=39,000) and 15 mg of Nafion-H were weighed out, then 1.5 mL of toluene containing a trace amount of water were added, and the mixture was reacted for 1 day in an oil bath of 100° C. After the reaction, 20 mL of chloroform was added to dissolve the contained material, and the insoluble catalyst was filtered off. Then the obtained solution was concentrated under a reduced pressure to obtain 15 mg of oligomers.

Figure 6:
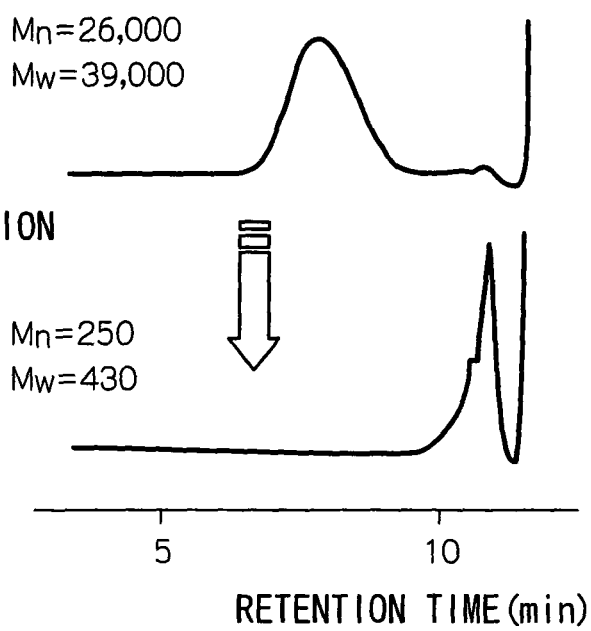
[FIG. 6] A graph showing a result of GPC analysis of the decomposition product in Example 10.

As a result of GPC analysis, it was confirmed that PCL was completely decomposed to generate oligomers having a molecular weight Mn=250 and Mw=430 (cf. FIG. 6)

Figure 7:
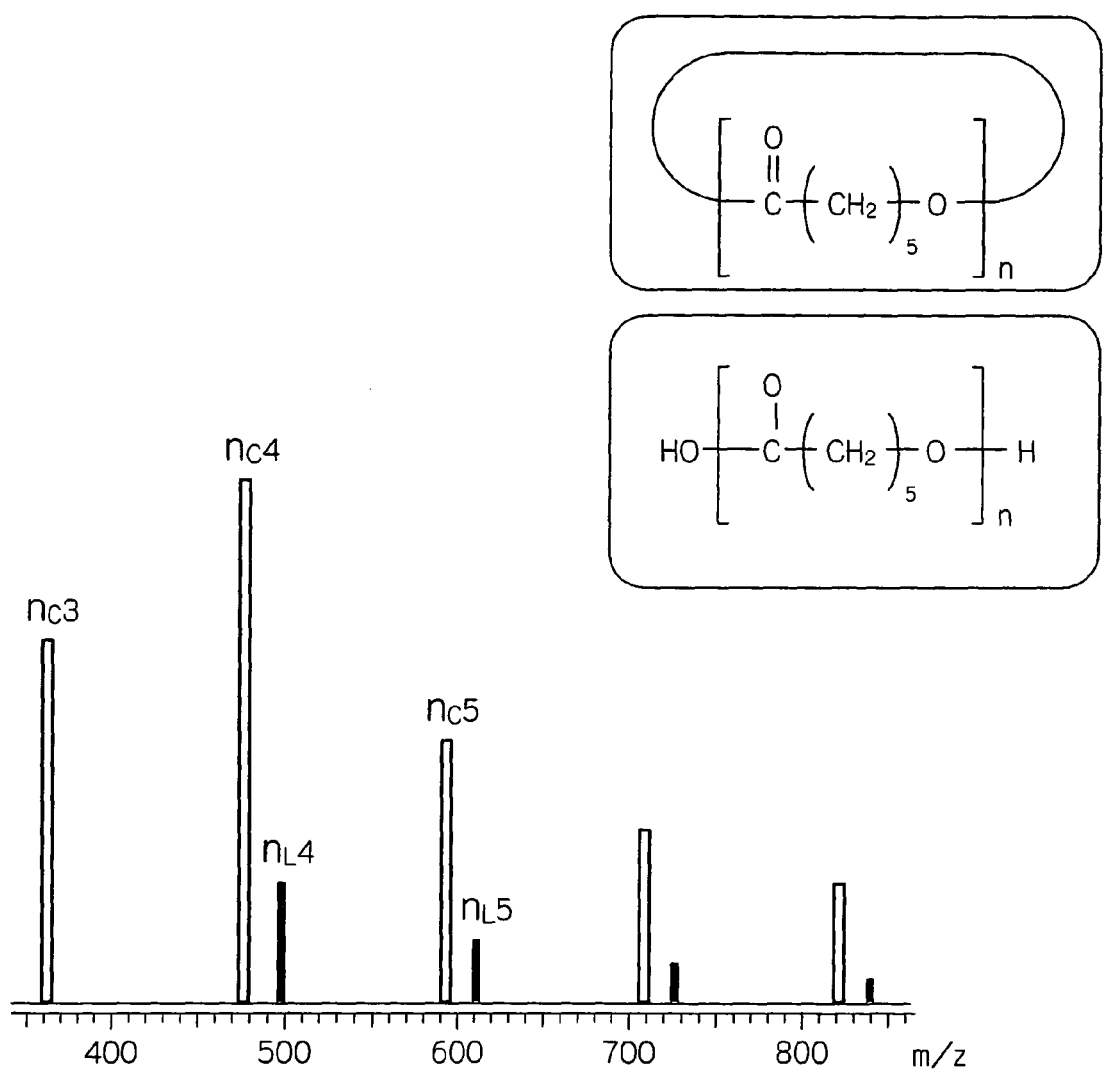
[FIG. 7] A graph showing a result of MALDI-TOF MS analysis of the decomposition product in Example 10.
Figure 11:
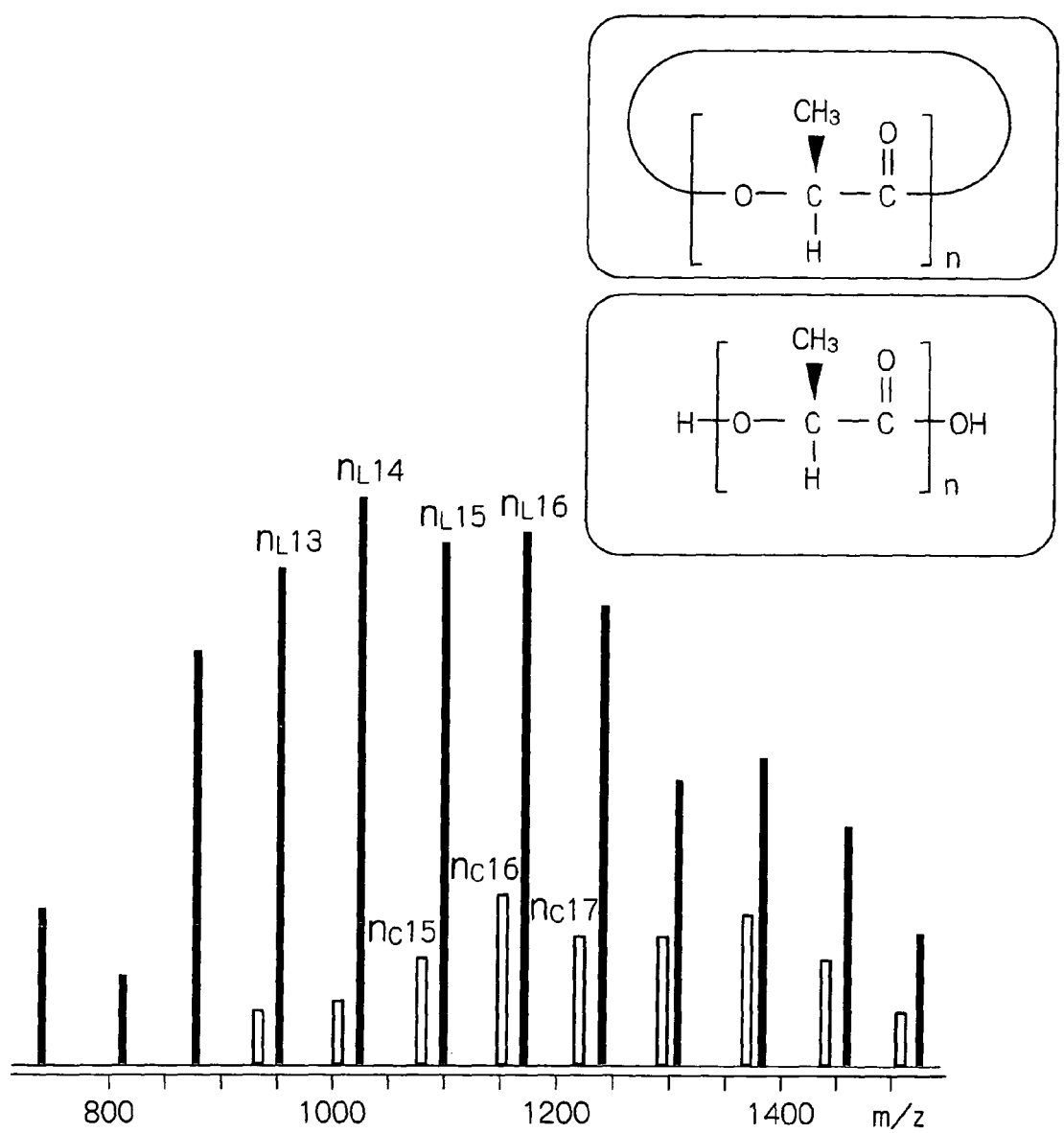
[FIG. 11] A graph showing a result of APCI MS analysis of the decomposition product in Example 12.

Also a MALDI-TOF MS analysis indicated generation of oligomers principally formed by a tetramer, and that cyclic ones were in a larger amount than linear ones (cf FIG. 7). FIG. 7, and FIGS. 9 and 11 in the following show oligomer peaks only in the result of MALDI-TOF MS analysis, excluding peaks of matrix and the like. Also in FIGS. 7, 9 and 11, framed white lines indicate cyclic oligomers while solid black lines indicate linear oligomers. Also in these graphs, for example nC4 indicates a cyclic tetramer oligomer, and nL4 indicates a linear tetramer oligomer.

EXAMPLE 11

Oligomer Formation from Polybutylene Adipate (PBA) by Nafion-H

In a small test tube equipped with a screwed cap, 15 mg of polybutylene adipate (PBA, molecular weight Mw=14,000) and 15 mg of Nafion-H were weighed, then 1.5 mL of toluene were added, and the mixture was reacted for 1 day in an oil bath of 100° C. After the reaction, 20 mL of chloroform was added to dissolve the contained material, and the insoluble catalyst was filtered off. Then the obtained solution was concentrated under a reduced pressure to obtain 8 mg of oligomers.

Figure 8:
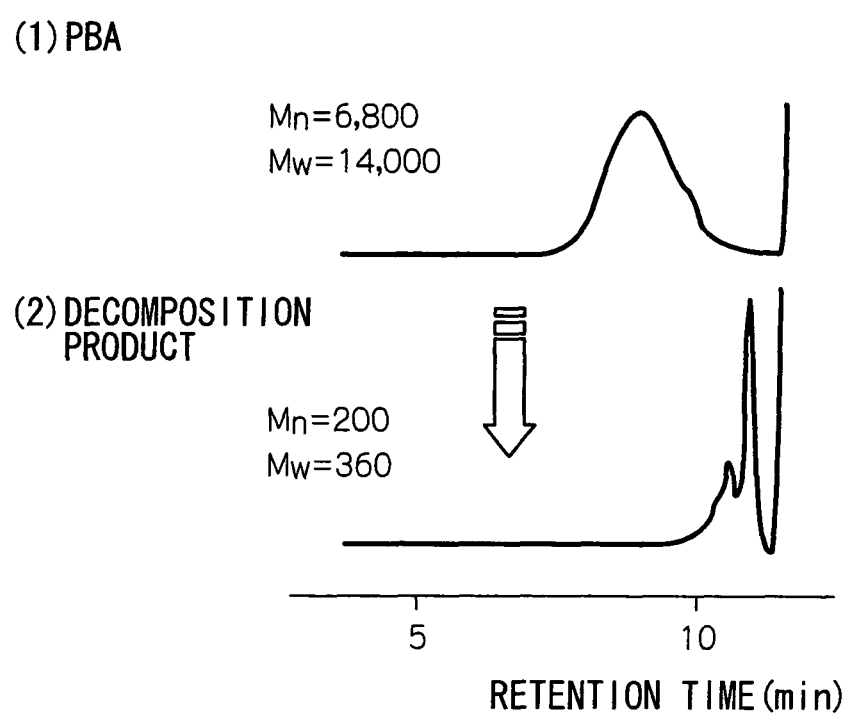
[FIG. 8] A graph showing a result of GPC analysis of the decomposition product in Example 11.

As a result of GPC analysis, it was confirmed that PBA was completely decomposed to generate oligomers having a molecular weight Mw=360 (cf FIG. 8).

Also a MALDI-TOF MS analysis indicated generation of oligomers principally formed by trimers, in which linear oligomers of (AB)nA type, having carboxyl groups on both terminal ends, were principal components (cf FIG. 9).

EXAMPLE 12

Oligomer Formation from Polylactic Acid (PLLA) by Nafion-H

Figure 10:
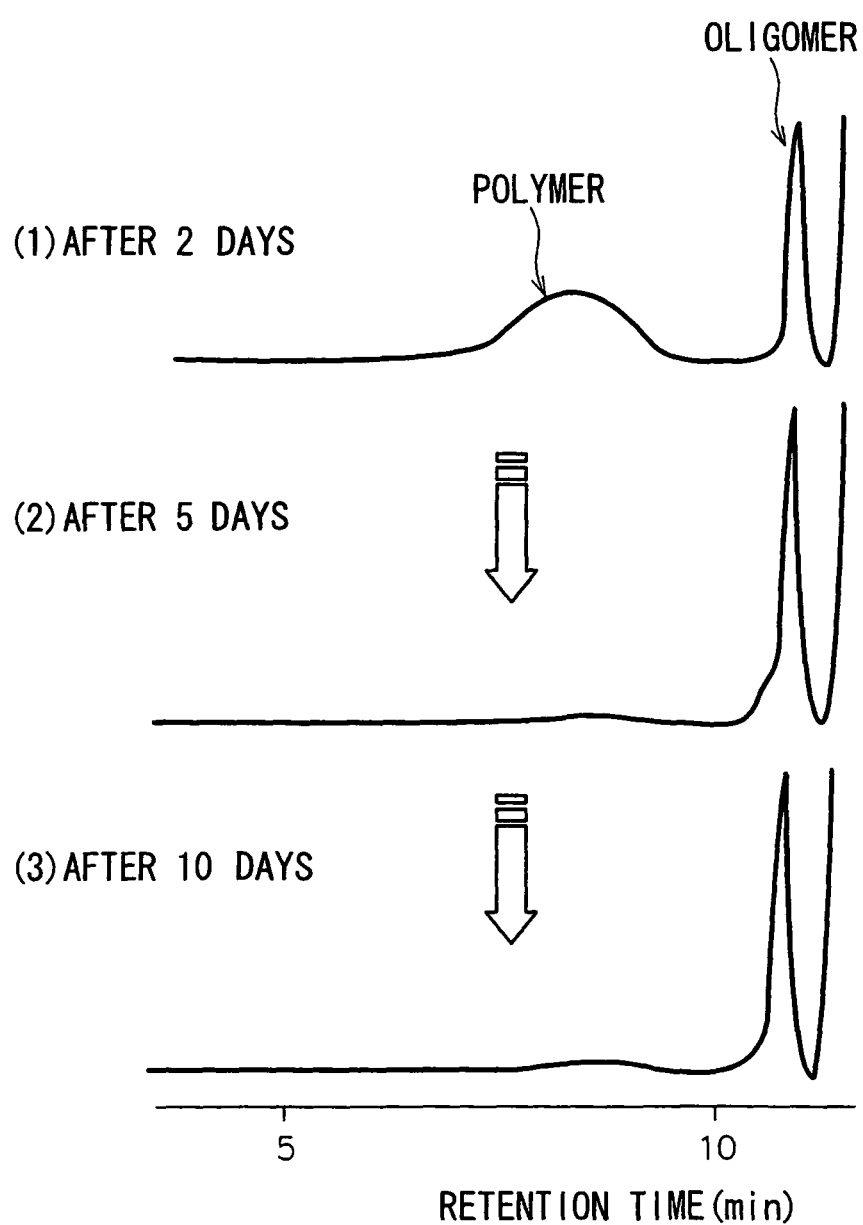
[FIG. 10] A graph showing a result of GPC analysis of the decomposition product in Example 12.

In each of three small test tubes equipped with screwed caps, 15 mg of polylactic acid (PLLA, molecular weight Mn=77,000, Mw=120,000) and 15 mg of Nafion-H were weighed, then 1.5 mL of toluene were added, and the mixtures were reacted respectively for 2, 5 and 10 days in an oil bath of 100° C. After the reaction, 20 mL of chloroform was added to each to dissolve the contained material, and the insoluble catalyst was filtered off. Then the each obtained solution was concentrated under a reduced pressure to obtain oligomers respectively in 14, 15 and 15 mg. In the sample reacted for 10 days, GPC analysis confirmed that PLLA was decomposed by about 85% to generate oligomers having a molecular weight Mw=170 (cf. FIG. 10).

Also an APCI MS analysis indicated generation of oligomers principally constituted of 14-mer to 16-mer, in which linear oligomers were principal components (cf FIG. 11).

As shown in the experiment above, the decomposition speed of PLLA was so low that the unreacted polymer still remained even after 5 days, but it was confirmed, by the following experiment, that the decomposition speed could be increased by increasing the amount of the catalyst.

Decomposition reactions were carried out in the same conditions as above, except for employing 15 mg of polylactic acid (PLLA) and Nafion-H in respective amounts of 50 mass % (7.5 mg), 200 mass % (30 mg) and 300 mass % (45 mg) and utilizing a reaction time of 1 day, and the products of the decomposition reaction were analyzed by GPC and MALDI-TOF MS analyses.

Figure 12:
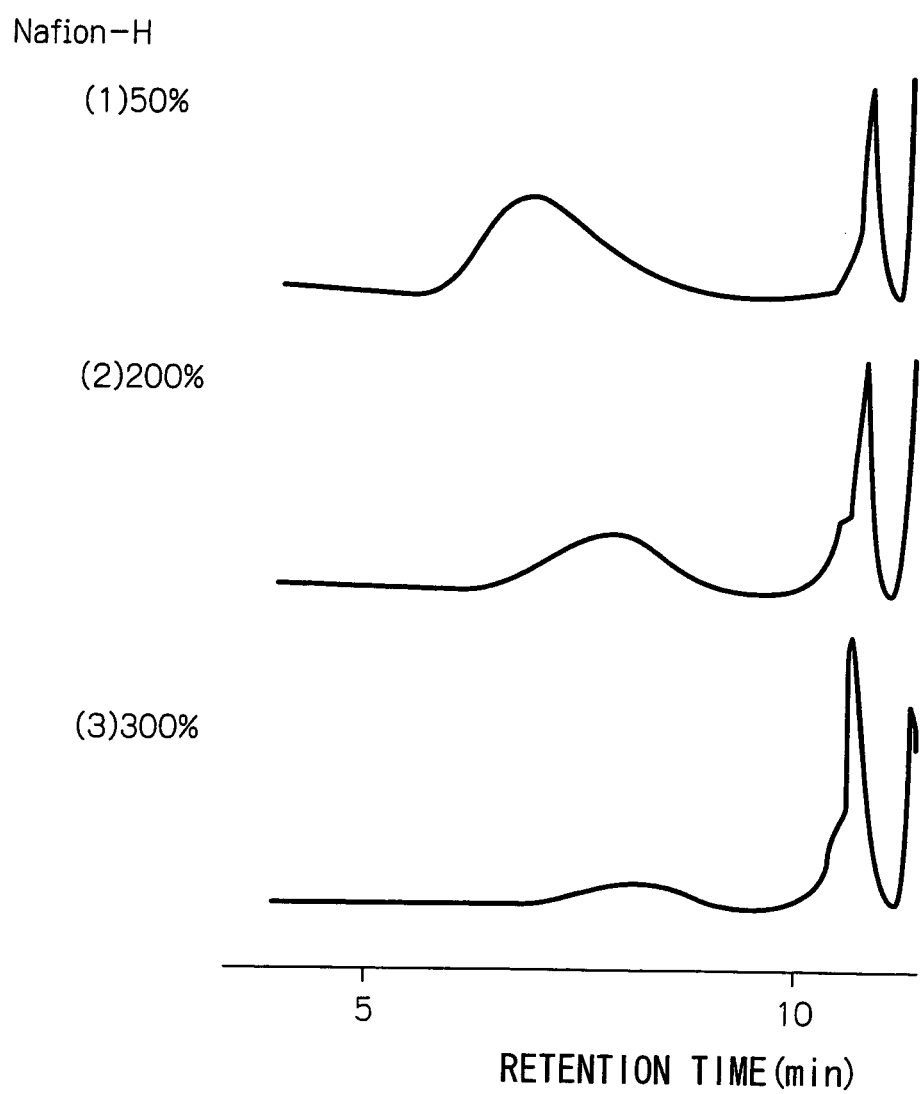
[FIG. 12] A graph showing a result of GPC analysis, indicating an oligomer generation state when the amount of Nafion-H is changed in Example 12.

GPC analysis indicated that, in case of using the solid acid catalyst in an amount of 200 mass %, a small amount of polymer still remained. However, the yield of oligomers could be elevated to 75% by employing Nafion-H in an amount of about 300% (cf FIG. 12).

Also a MALDI-TOF MS analysis indicated generation of oligomers principally formed by tetramers, in which linear oligomers were present more than cyclic oligomers.

EXAMPLE 13

Oligomer Formation from Polybutylene Succinate (PBS) by Montmorillonite K10

In a small test tube equipped with a screwed cap, 15 mg of polybutylene succinate (PBS, molecular weight Mw=99,000) and 75 mg of Montmorillonite K10 were weighed, then 1.5 mL of toluene were added, and the mixture was reacted for 1 day in an oil bath of 100° C. After the reaction, 10 mL of chloroform was added to dissolve the contained material, and the insoluble catalyst was filtered off. Then the obtained solution was concentrated under a reduced pressure to obtain oligomers with an yield of 75%.

As a result of GPC analysis, it was confirmed that PBS was completely decomposed to generate oligomers having a molecular weight Mw=600.

Also a MALDI-TOF MS analysis confirmed that the product was a mixture of linear oligomers of ABA type, having carboxyl groups on both terminal ends of an oligomer chain, AB type having a carboxyl group and a hydroxyl group on both terminal ends of an oligomer chain and so on, and cyclic oligomers.

The invention claimed is:

1. A depolymerization method for a polymer containing an ester bond in a main chain, the method comprising:
    causing a solid acid catalyst to act on a polymer containing an ester bond in a main chain to depolymerize the polymer without the use of an alkali, thereby obtaining a re-polymerizable monomer and/or oligomer as a depolymerization product,
    wherein
    an amount of the solid acid catalyst is from 300 to 1,000 mass % with respect to a mass of the polymer,
    the solid acid catalyst is selected from the group consisting of sulfated zirconia (VI), vermiculites and heteropolyacids, and
    the solid acid catalyst is insoluble.

2. The depolymerization method for a polymer containing an ester bond in a main chain according to claim 1, wherein the polymer containing an ester bond in a main chain is polylactic acid, polylactone, polyalkylene alkanoate or poly(3-hydroxyalkanoate).

3. A method for producing a polymer containing an ester bond in a main chain, which comprises polymerizing the re-polymerizable monomer and/or the oligomer obtained by the depolymerization method according to claim 1.

4. A method for producing a polymer containing an ester bond in a main chain, which comprises polymerizing the re-polymerizable monomer and/or the oligomer obtained by the depolymerization method according to claim 2.

5. The depolymerization method for a polymer containing an ester bond in a main chain according to claim 1, wherein the solid acid catalyst is caused to act on the polymer in a solvent.

6. The depolymerization method for a polymer containing an ester bond in a main chain according to claim 1, wherein the solid acid catalyst is caused to act on the polymer at a temperature of 100° C.

7. The depolymerization method for a polymer containing an ester bond in a main chain according to claim 2, wherein the solid acid catalyst is caused to act on the polymer in a solvent.

8. The depolymerization method for a polymer containing an ester bond in a main chain according to claim 2, wherein the solid acid catalyst is caused to act on the polymer at a temperature of 100° C.

9. A depolymerization method for a polymer containing an ester bond in a main chain, the method comprising:
   causing a solid acid catalyst to act on a polymer containing an ester bond in a main chain to depolymerize the polymer without the use of an alkali, thereby obtaining a re-polymerizable monomer and/or oligomer as a depolymerization product,
   wherein
   an amount of the solid acid catalyst is from 300 to 1,000 mass % with respect to a mass of the polymer,
   the solid acid catalyst is insoluble, and
   the solid acid catalyst is montmorillonite.

10. The depolymerization method for a polymer containing an ester bond in a main chain according to claim 9, wherein the polymer containing an ester bond in a main chain is polylactic acid, polylactone, polyalkylene alkanoate or poly(3-hydroxyalkanoate).

11. A method for producing a polymer containing an ester bond in a main chain, which comprises polymerizing the re-polymerizable monomer and/or the oligomer obtained by the depolymerization method according to claim 9.

12. A method for producing a polymer containing an ester bond in a main chain, which comprises polymerizing the re-polymerizable monomer and/or the oligomer obtained by the depolymerization method according to claim 10.

13. The depolymerization method for a polymer containing an ester bond in a main chain according to claim 9, wherein the solid acid catalyst is caused to act on the polymer in a solvent.

14. The depolymerization method for a polymer containing an ester bond in a main chain according to claim 9, wherein the solid acid catalyst is caused to act on the polymer at a temperature of 100° C.

15. The depolymerization method for a polymer containing an ester bond in a main chain according to claim 10, wherein the solid acid catalyst is caused to act on the polymer in a solvent.

16. The depolymerization method for a polymer containing an ester bond in a main chain according to claim 10, wherein the solid acid catalyst is caused to act on the polymer at a temperature of 100° C.

17. The depolymerization method for a polymer containing an ester bond in a main chain according to claim 13, wherein the solvent is toluene.

18. The depolymerization method for a polymer containing an ester bond in a main chain according to claim 17, wherein the polymer containing an ester bond in a main chain is polylactic acid and the solid acid catalyst is caused to act on the polymer at a temperature of 100° C.

\* \* \* \* \*